(12) United States Patent
Lee et al.

(10) Patent No.: US 12,072,013 B2
(45) Date of Patent: Aug. 27, 2024

(54) DIFFERENTIAL GEAR DEVICE FOR A VEHICLE

(71) Applicants: HYUNDAI MOTOR COMPANY, Seoul (KR); KIA CORPORATION, Seoul (KR)

(72) Inventors: Hyun Ku Lee, Seoul (KR); Moosuk Kim, Hwaseong-si (KR); Kihyun Lee, Gyeongju-si (KR); Jae Oh Kwak, Jeonju-si (KR); Geum Muk Chae, Hwaseong-si (KR); Jung-Hwan Moon, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 48 days.

(21) Appl. No.: 17/698,201

(22) Filed: Mar. 18, 2022

(65) Prior Publication Data
US 2023/0204094 A1    Jun. 29, 2023

(30) Foreign Application Priority Data
Dec. 29, 2021 (KR) .................... 10-2021-0190834

(51) Int. Cl.
*F16H 57/028* (2012.01)
*F16H 48/08* (2006.01)
(Continued)

(52) U.S. Cl.
CPC ........... *F16H 57/028* (2013.01); *F16H 48/08* (2013.01); *F16H 57/031* (2013.01);
(Continued)

(58) Field of Classification Search
CPC ........ F16H 48/08; F16H 48/20; F16H 57/028; F16H 57/031; F16H 57/037; F16H 57/042; F16H 57/0424
See application file for complete search history.

(56) References Cited

U.S. PATENT DOCUMENTS 3,587,346 A * 6/1971 Hitomi .................... F16H 48/22
475/904
2005/0187062 A1* 8/2005 Joki ....................... F16H 57/021
475/230
(Continued)

FOREIGN PATENT DOCUMENTS

CN       104864065 A  *  8/2015  ............. F16H 48/40
DE    102009037428 A1  *  2/2010  ............. F16H 48/08
WO       WO-9116557 A1  * 10/1991

OTHER PUBLICATIONS

DE 1020090374828 A1 (Kenneth Cooper) (full text). [online] [retrieved on Feb. 20, 2024]. Retrieved from: Clarivate Analytics. (Year: 2010).*

*Primary Examiner* — Joseph Brown
(74) *Attorney, Agent, or Firm* — Lempia Summerfield Katz LLC

(57) ABSTRACT

A differential gear device for a vehicle including a housing, a pinion shaft provided inside the housing, a pinion gear respectively mounted on both ends of the pinion shaft, and a pair of side gears respectively disposed on both sides of a width direction of a vehicle and engaged to the pinion gear. A disconnector actuator system is coupled to one side gear and a drive shaft is coupled to the other side gear among the pair of side gears. The differential gear device for the vehicle includes a noise reduction unit provided between the cover to which the drive shaft is coupled and the other side gear to prevent a whine noise from being generated between
(Continued)

the pinion gear and the other side gear during the operation of the disconnector actuator system.

9 Claims, 5 Drawing Sheets

(51) Int. Cl.
  *F16H 57/031* (2012.01)
  *F16H 57/037* (2012.01)
  *F16H 57/04* (2010.01)
  *F16H 48/20* (2012.01)
(52) U.S. Cl.
  CPC ......... *F16H 57/037* (2013.01); *F16H 57/042* (2013.01); *F16H 57/0424* (2013.01); *F16H 48/20* (2013.01)

(56) References Cited

U.S. PATENT DOCUMENTS

2014/0339888 A1* 11/2014 Downs .................... B60B 35/18
                                                                               301/137
2023/0038311 A1* 2/2023 Yasui .................. F16H 57/0479

\* cited by examiner

DIFFERENTIAL GEAR DEVICE FOR A VEHICLE

CROSS-REFERENCE TO RELATED APPLICATION

This application claims priority to and the benefit of Korean Patent Application No. 10-2021-0190834 filed in the Korean Intellectual Property Office on Dec. 29, 2021, the entire contents of which are incorporated herein by reference.

BACKGROUND

(a) Field of the Disclosure

The present disclosure relates to a differential gear device for a vehicle. More particularly, the present disclosure relates to a differential gear device for a vehicle to reduce or prevent a whine noise generated during operation of a disconnecter actuator system in an electric vehicle.

(b) Description of the Related Art

Environmentally-friendly technology for a vehicle is a core technology, which is important for the future of the automobile industry. Advanced car makers have focused their energy and resources on the development of an environmentally-friendly vehicle to achieve environmental and fuel efficiency regulations.

In response to such demands, the technology for enhancement, increasing, or improving fuel efficiency and weight reduction of the driving system are continuously being developed.

On the other hand, an all-wheel driving method is being more recently applied to electric vehicles. In this all-wheel driving method, a sensor may detect the driving environment and the driving torque may be adjusted according to a determination of the driving system so that driving safety is improved and fuel efficiency is improved.

Such an electric vehicle is provided with a differential gear device and a disconnector actuator system.

In general, the differential gear device automatically provides a rotation difference when the vehicle turns or when a difference in rotation is required for the left and right wheels due to protrusions and depressions on the road surface. The rotation difference prevents the wheels from slipping and enables smooth driving.

In addition, the differential gear device may control the vehicle to be driven safely by self-controlling the power when the vehicle slides to one side in snow or rain.

Such a differential gear device includes a pinion gear, a side gear, a ring gear, and a case. The pinion gear is coupled to a side gear that is splined to the drive shaft.

The disconnector actuator system is mounted on a reducer of the electric vehicle. The disconnector actuator system is a device that separates or connects the drive shaft connected to the differential gear device according to the driving situation.

This disconnector actuator system reduces unnecessary power loss and improves efficiency by switching four-wheel drive to two-wheel drive by disconnecting one drive shaft connected to the differential gear device when driving at a high speed and/or when not driving on snowy or rough roads. Thereby, power consumption may be reduced and a travel distance may be increased.

However, when the power on one side of the drive shaft is cut off by operation of the disconnector actuator system in the conventional electric vehicle as described above, the side gear is rotated at high speed while interlocking with the vehicle speed by the drive shaft. At this time, noise is generated between the side gear and the pinion gear.

In other words, the high-speed rotating drive shaft generates a thrust toward the differential gear device. The generated thrust of the drive shaft is transmitted to the side gear by the frictional force acting between the drive shaft and the side gear.

Then, the side gear is pushed toward the pinion gear from the inside of the differential gear device and moved.

Accordingly, as the backlash between the side gear and the pinion gear decreases, the tooth contact between the side gear and the pinion gear becomes poor. This causes a problem in which a whine noise s generated in the differential gear device.

In addition, the whine noise generated from the differential gear device during driving causes discomfort to the occupants during driving of the vehicle and deteriorates overall commercial qualities of the vehicle.

The above information disclosed in this Background section is only to enhance understanding of the background of the disclosure. Therefore, the Background section may contain information that does not form the prior art that is already known in this country to a person of ordinary skill in the art.

SUMMARY

The present inventive concept is devised to solve the problem as described above. An object of the present inventive concept is to provide a vehicle differential gear device to reduce or prevent a whine noise generated during the operation of a disconnector actuator system in an electric vehicle.

A differential gear device for the vehicle according to an embodiment of the present disclosure includes: a housing; a pinion shaft provided inside the housing; a pinion gear respectively mounted on both ends of the pinion shaft; and a pair of side gears respectively disposed on both sides of a width direction of a vehicle and engaged to the pinion gear. A disconnector actuator system is coupled to one side gear and a drive shaft is coupled to the other side gear among a pair of the side gears. The differential gear device for the vehicle also includes a noise reduction unit provided between the cover to which the drive shaft is coupled and the other side gear coupled to the drive shaft to prevent a whine noise from being generated between the pinion gear and the other side gear during the operation of the disconnector actuator system.

A cover may be coupled to the housing.

The noise reduction unit may include: a catching groove formed on an interior circumference of the cover at one end of the cover facing the drive shaft; a mount groove formed on an exterior circumference of the gear shaft provided in the other side gear at a location corresponding to the catching groove; and an elastic member mounted in the mount groove to provide an elastic force to the other side gear against the cover in a direction towards the drive shaft.

The elastic member may be a ring spring.

The catching groove may be machined to have an interior diameter that is greater than an exterior diameter of the gear shaft.

At least one oil groove communicating with the inside of the cover may be formed in the catching groove.

At least one oil groove may supply oil from the housing to the elastic member.

The noise reduction unit may include: a spacer mounted on an end of the cover facing the drive shaft; a mount groove formed on an exterior circumference of the gear shaft provided in the other side gear at a location corresponding to the spacer; and a supporting member mounted in the mount groove to provide a reaction force on the cover through the spacer in a direction toward the drive shaft and to support the spacer.

The spacer may have one surface borne against or abutting the cover and another surface borne against or abutting the supporting member based on the axial direction of the drive shaft.

The spacer may be formed of a plastic, copper, or polyether ether ketone material.

The supporting member may be a ring spring or a snap ring.

As described above, according to the differential gear device for a vehicle according to an embodiment of the present inventive concept, it is possible to reduce or prevent a whine noise generated during operation of the disconnecter actuator system while driving in an electric vehicle.

In addition, the present inventive concept applies the noise reduction unit and acts as a reaction force against the frictional force between the drive shaft and the side gear. Accordingly, the cause of whine noise may be fundamentally blocked (e.g., prevented or reduced) by effectively preventing the thrust of the drive shaft from being transmitted to the side gear by frictional force.

In addition, the present inventive concept may reduce manufacturing cost, work man-hours, and maintenance cost by applying the noise reduction unit, which has a simple configuration.

Furthermore, the present inventive concept may improve ride comfort for the vehicle occupants and improve the overall marketability of the vehicle by reducing or preventing the whine noise generated during driving of the vehicle.

DETAILED DESCRIPTION OF THE EMBODIMENTS

Figure 1:
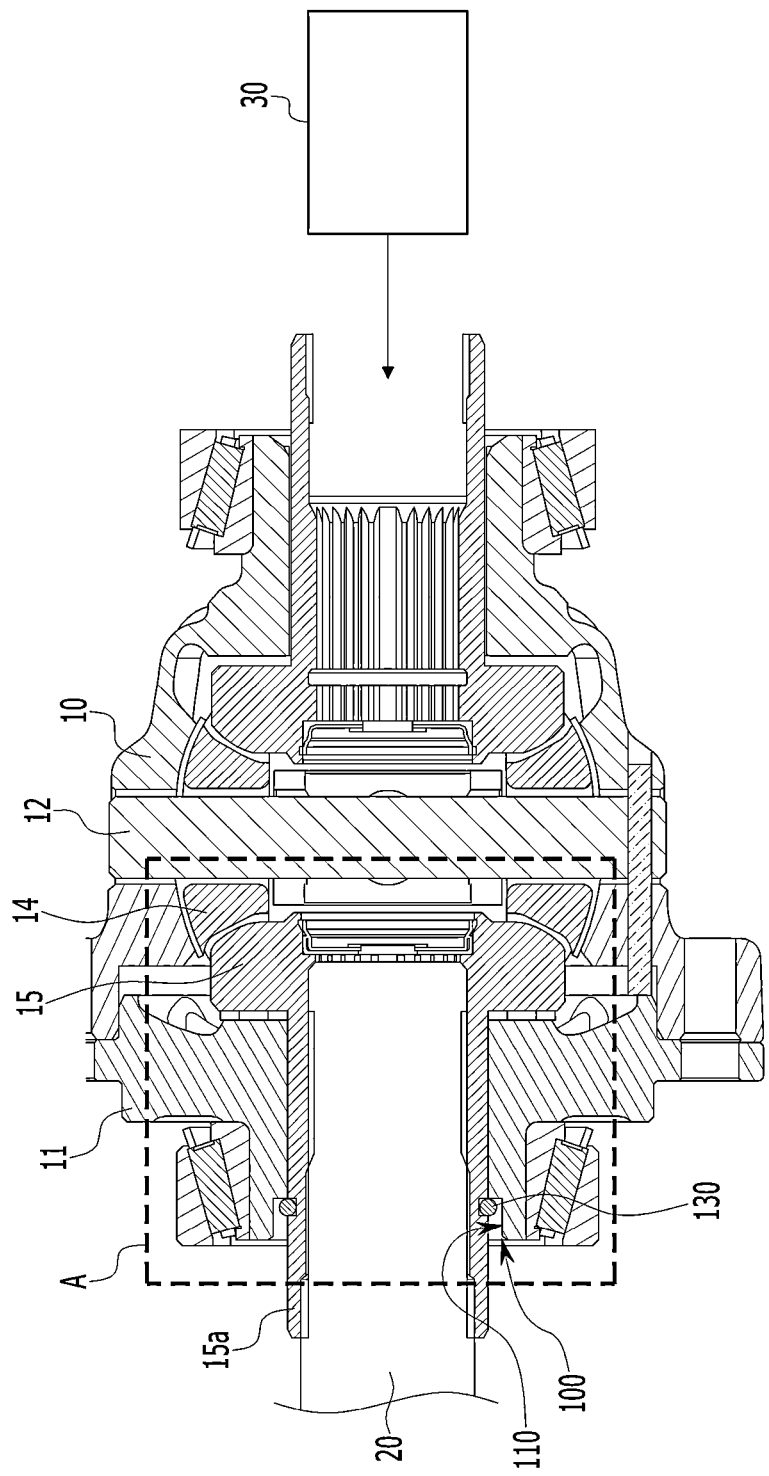
FIG. 1 is a partial cross-sectional view of a differential gear device according to an embodiment of the present disclosure.

An embodiment of the present disclosure is hereinafter described in detail with reference to the accompanying drawings.

Embodiments described in the present specification and configurations shown in the drawings are embodiments of the present inventive concept, but do not limit the spirit and scope of the present inventive concept. Therefore, it should be understood that various equivalents and modifications may be applied to the embodiments and configurations disclosed herein at the time of filing of the present application.

In order to clarify the present disclosure, parts that are not connected with the description have been omitted. The same elements or equivalents are referred to by the same reference numerals throughout the specification.

The size and thickness of each element are arbitrarily shown in the drawings, and the present disclosure is not necessarily limited thereto. In the drawings, the thickness of layers, films, panels, regions, etc., are exaggerated for clarity.

In addition, unless explicitly described to the contrary, the word "comprise", and variations such as "comprises" or "comprising", should be understood to imply the inclusion of stated elements but not the exclusion of any other elements.

Further, the terms, " . . . unit", " . . . mechanism", " . . . portion", " . . . member" etc. used herein mean the unit of inclusive components performing at least one or more functions or operations. When a component, device, element, i.e., a unit, mechanism, portion, member, or the like of the present disclosure is described as having a purpose or performing an operation, function, or the like, the component, device, or element should be considered herein as being "configured to" meet that purpose or perform that operation or function.

Figure 2:
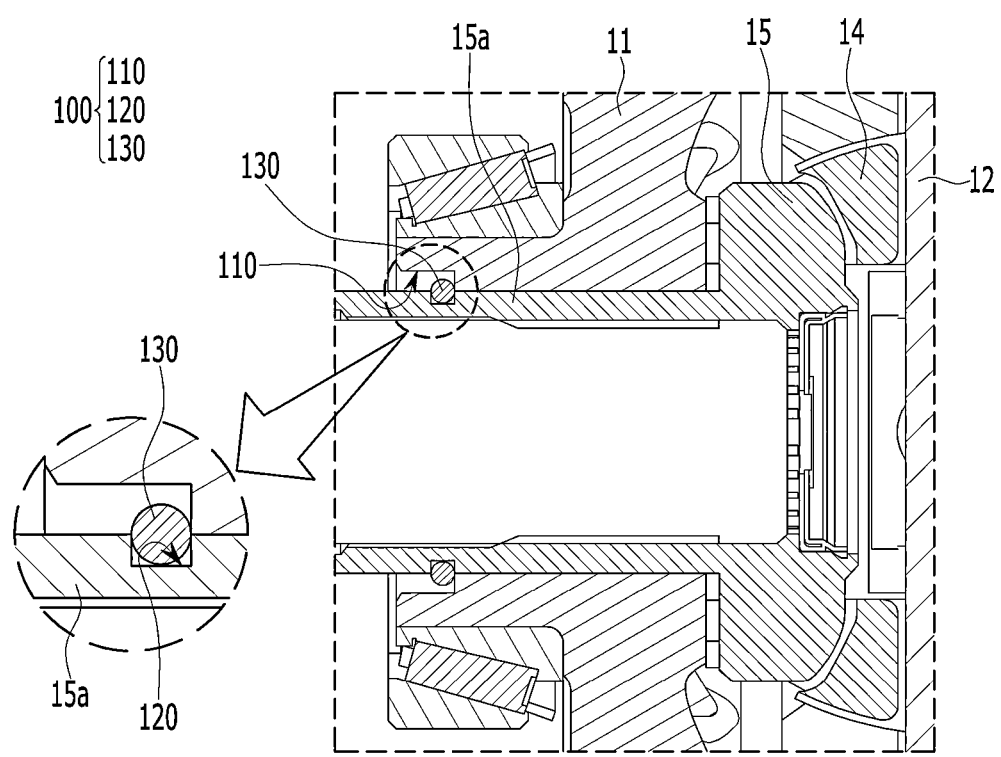
FIG. 2 is an enlarged view of a portion A of FIG. 1.
Figure 3:
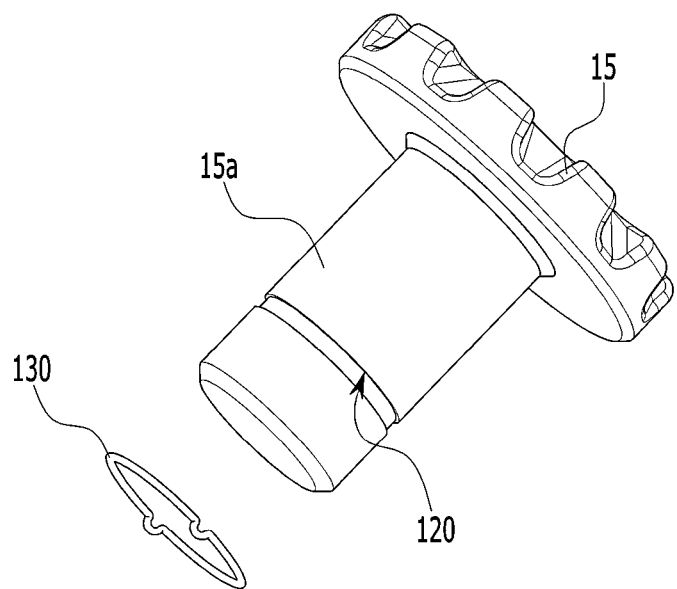
FIG. 3 is an exploded perspective view of a side gear and a noise reduction unit applied to a differential gear device according to an embodiment of the present disclosure.
Figure 4:
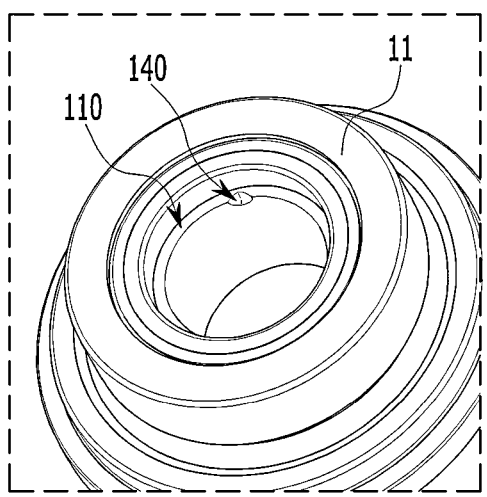
FIG. 4 is a partial perspective view of a cover applied to a differential gear device according to an embodiment of the present disclosure.

FIG. 1 is a partial cross-sectional view of a differential gear device according to an embodiment of the present disclosure. FIG. 2 is an enlarged view of a portion A of FIG. 1. FIG. 3 is an exploded perspective view of a side gear and a noise reduction unit applied to a differential gear device according to an embodiment of the present disclosure. FIG. 4 is a partial perspective view of a cover applied to a differential gear device according to an embodiment of the present disclosure.

Referring to the accompanying drawings, a differential gear device for a vehicle according to an embodiment of the present disclosure may reduce or prevent a whine noise generated during the operation of a disconnector actuator system 30 in an electric vehicle.

To this end, the differential gear device according to an embodiment of the present disclosure, as shown in FIG. 1, may basically include a housing 10, a cover 11, a pinion shaft 12, a pinion gear 14, and a side gear 15.

First, the housing 10 is formed with a space inside. The cover 11 may be coupled to the open surface of the housing 10.

The pinion shaft 12 is provided inside the housing 10, and a pinion gear 14 is mounted on both ends of the pinion shaft 12, respectively.

The side gear 15 is composed of a pair of side gears 15 disposed on both sides of the width direction of the vehicle inside the housing 10, Each side gear 15 may be engaged with a corresponding pinion gear 14.

Here, among a pair of side gears 15, the disconnector actuator system 30 may be coupled to the side gear 15 disposed on the right side (e.g., one side gear, a first side gear) based on the drawing.

Also, the drive shaft 20 may be coupled to the other side gear 15 disposed on the left (e.g., the other side gear, a second side gear) based on the drawing.

In the present embodiment, a hollow gear shaft 15a may be integrally formed with the side gear 15 such that the drive shaft 20 is spline-coupled to the other side gear 15.

The differential gear device configured in this way includes a noise reduction unit 100 provided between the other side gear 15 to which the drive shaft 20 is coupled and the cover 11 to prevent the whine noise from being generated between the pinion gear 14 and the side gear 15 during the operation of the disconnecter actuator system 30.

In an embodiment of the present disclosure, the noise reduction unit 100, as shown in FIGS. 1-4, may include a catching groove 110, a mount groove 120, and an elastic member 130.

First, the catching groove 110 is formed on the interior circumference of the cover 11 at one end of the cover 11 facing the drive shaft 20.

The mount groove 120 is formed on the outer peripheral surface of the gear shaft 15a provided with the side gear 15 to correspond to a location of the catching groove 110.

Also, the elastic member 130 is mounted in the mount groove 120 to provide an elastic force to the side gear 15 with respect to the cover 11 in the direction towards the drive shaft 20.

Here, the elastic member 130 may be a ring spring.

On the other hand, in an embodiment of the present disclosure, the catching groove 110 may be machined or otherwise formed with a diameter of which the interior diameter is larger than the exterior diameter of the gear shaft 15a.

Accordingly, when a worker assembles and disassembles the elastic member 130 to the mount groove 120, workability may be improved.

When the thrust of the drive shaft 20 is transmitted to the other side gear 15 by the frictional force during the operation of the disconnector actuator system 30, in the state of which the elastic member 130 is mounted in the mount groove 120, the noise reduction unit 100 configured in this way is hooked to the catching groove 110. Accordingly, it is possible to provide an elastic force to the side gear 15 in the opposite direction to the thrust of the drive shaft 20.

On the other hand, in another embodiment of the present disclosure as illustrated in FIG. 4, at least one oil groove 140 communicating with the inner side of the cover 11 may be formed in the catching groove 110.

The at least one oil groove 140 may supply the oil from the housing 10 to the elastic member 130.

In other words, the oil supplied to the elastic member 130 by the oil groove 140 may lubricate the elastic member 130.

Accordingly, when the elastic member 130 provides the elastic force to the side gear 15 with respect to the cover 11, the oil may minimize friction contact of the elastic member 130 with the cover 11 and the mount groove 120.

When the disconnector actuator system 30 is operated, as the elastic member 130 provides the elastic force to the side gear 15 with respect to the cover 11 in the direction toward the drive shaft 20, the noise reduction unit 100 configured in this way may act to provide a reaction force together with the cover 11.

In other words, in the state that the elastic member 130 is caught in the catching groove 110, the noise reduction unit 100 may use the elastic force provided to the side gear 15 to prevent the thrust of the drive shaft 20 from being transmitted to the side gear 15 by the frictional force between the side gear 15 and the drive shaft 20.

Accordingly, the side gear 15 may be prevented from being pushed toward the pinion gear 14 by the thrust of the drive shaft 20.

Resultantly, the noise reduction unit 100 may fundamentally block (e.g., prevent or reduce) the cause of the whine noise by preventing the phenomenon of the backlash between the pinion gear 14 and the side gear 15 from becoming smaller.

The differential gear device according to another embodiment of the present disclosure is described with reference to FIG. 5.

Figure 5:
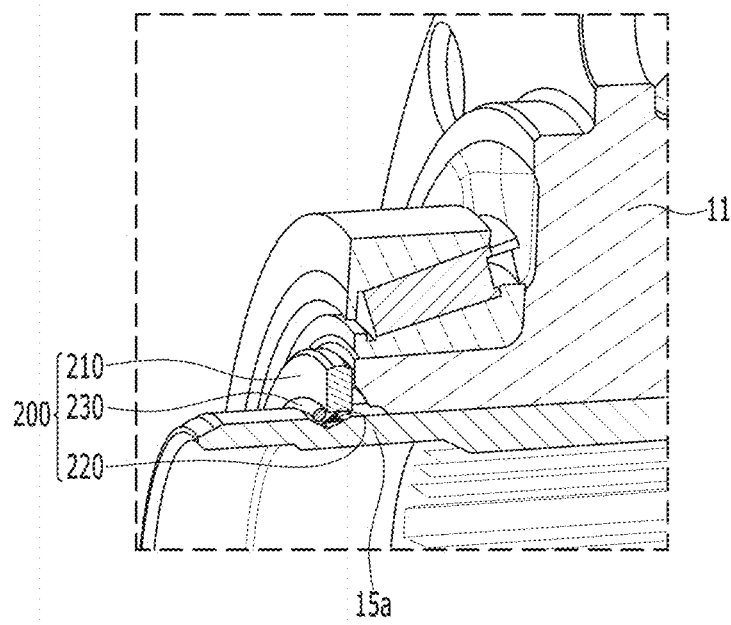
FIG. 5 is a partially cut-away perspective view of a differential gear device according to another embodiment of the present disclosure.

FIG. 5 is a partially cut-away perspective view of a differential gear device according to another embodiment of the present disclosure.

The differential gear device according to another embodiment of the present disclosure may basically include a housing 10, a cover 11, a pinion shaft 12, a pinion gear 14, and a side gear 15.

First, the housing 10 is formed with a space inside. The cover 11 may be coupled to one opened surface of the housing 10.

The pinion shaft 12 is provided inside the housing 10, and a pinion gear 14 is mounted on both ends of the pinion shaft 12, respectively.

Also, the side gear 15 is composed of a pair of side gears 15 disposed on both sides of the width direction of the vehicle inside the housing 10. The side gears 15 may be engaged with the pinion gears 14.

Here, among the pair of the side gears 15, the disconnector actuator system 30 may be connected to the side gear 15 disposed on the right side (e.g., one side, a first side) based on the drawing.

Also, the drive shaft 20 may be coupled to the other side (e.g., a second side) gear 15 disposed on the left based on the drawing.

In the present embodiment, a hollow gear shaft 15a may be integrally formed with the side gear 15 such that the drive shaft 20 is spline-coupled to the side gear 15.

The differential gear device configured in this way includes a noise reduction unit 200 provided between the other side gear 15 to which the drive shaft 20 is coupled and the cover 11 so that the whine noise is prevented from being caused between the pinion gear 14 and the side gear 15 during the operation of the disconnector actuator system 30.

In other words, the differential gear device according to this alternative embodiment of the present disclosure has the same basic configuration as the above-described embodiment. However, the configuration of the noise reduction unit 200 is different.

Referring to FIG. 5, the noise reduction unit 200 according to another embodiment of the present disclosure may include a spacer 210, a mount groove 220, and a supporting member 230.

First, the spacer 210 is mounted on the end of the cover 11 facing the drive shaft 20.

Here, the spacer 210 may be formed of a material such as plastic, copper, or polyether ether ketone.

In the present embodiment, the mount groove 220 is formed on the exterior circumference of the gear shaft 15a provided with the side gear 15 at a location corresponding to the spacer 210.

Also, the supporting member 230 may be mounted on the mount groove 220 to provide a reaction force on the cover 11 through the spacer 210 in the direction toward the drive shaft 20 and to support the spacer 210.

This supporting member 230 may be a ring spring or a snap ring.

On the other hand, in the present embodiment, one surface of the spacer 210 may be borne against or abut the cover 11 based on the axial direction of the drive shaft 20, and the other surface of the spacer 210 may be borne against or abut the supporting member 230. Accordingly, the spacer 210 may be retained or held in place by or between the cover 11 and the supporting member 230.

In other words, when the thrust of the drive shaft 20 is transmitted to the side gear 15 by frictional force during the operation of the disconnector actuator system 30, the spacer 210 may provide the reaction force to the side gear 15 in the opposite direction to the thrust the drive shaft 20 while being supported by the cover 11 and the supporting member 230.

The noise reduction unit 200 configured in this way provides the reaction force to the side gear 15 with respect to the cover 11 in the direction in which the spacer 210 faces the drive shaft 20 when the disconnector actuator system 30 is operated.

In other words, the noise reduction Unit 200 may prevent the thrust of the drive shaft 20 from being transmitted to the side gear 15 by the frictional force between the side gear 15 and the drive shaft 20 by using the reaction force of the spacer 220 and the supporting member 230.

Accordingly, the side gear 11 may be prevented from being pushed and moved toward the pinion gear 14 by the thrust of the drive shaft 20.

As a result, the noise reduction unit 200 may fundamentally block (e.g., prevent or reduce) the cause of whine noise by preventing the phenomenon of the backlash between the pinion gear 14 and the side gear 15 from becoming smaller.

Therefore, the differential gear device for the vehicle according to embodiments of the present disclosure as described above, the whine noise generated during the operation of the disconnector actuator system 30 while driving in the electric vehicle can be reduced or prevented by using the noise reduction units 100 and 200.

In addition, the present inventive concept applies the noise reduction unit 100 or 200 to act as the reaction force against the frictional force between the drive shaft 20 and the side gear 15. The cause of whine noise may thereby be fundamentally blocked (e.g., prevented or reduced) by effectively preventing the thrust of the drive shaft 20 from being transmitted to the side gear 15 by frictional force.

In addition, the present inventive concept may reduce manufacturing cost, work man-hours, and maintenance cost by applying the noise reduction unit 100 and 200 of a simple configuration.

Furthermore, the present inventive concept may improve ride comfort of for the vehicle occupants and improve the overall marketability of the vehicle by reducing or preventing the whine noise generated during driving of the vehicle.

While this inventive concept has been described in connection with what is presently considered to be several embodiments, it is to be understood that the inventive concept is not limited to the disclosed embodiments. On the contrary, the present disclosure is intended to cover various modifications and equivalent arrangements included within the spirit and scope of the appended claims.

DESCRIPTION OF SYMBOLS

10: housing
11: cover
12: pinion shaft
14: pinion gear
15: side gear
15a: gear shaft
20: drive shaft
30: disconnecter actuator system
100, 200: noise reduction unit
110: catching groove
120, 220: mount groove
130: elastic member
140: oil groove
210: spacer
230: supporting member

What is claimed is:

1. A differential gear device for a vehicle, the differential gear device comprising:
   a housing;
   a pinion shaft provided inside the housing;
   pinion gears, one each respectively mounted on both ends of the pinion shaft; and
   a pair of side gears respectively disposed on both sides of a width direction of the vehicle and respectively engaged to the pinion gears,
   wherein a disconnector actuator system is coupled to one side gear and a drive shaft is coupled to the other side gear among the pair of side gears,
   wherein the differential gear device for the vehicle includes a noise reduction device provided between a cover and the other side gear coupled to the drive shaft to prevent a noise from being generated between one pinion gear of the pinion gears and the other side gear during operation of the disconnector actuator system,
   wherein the noise reduction device prevents backlash between the one pinion gear and the other side gear from becoming smaller,
   wherein the noise reduction device includes
      a spacer mounted on an end of the cover facing the drive shaft,
      a mount groove formed on an exterior circumference of the gear shaft provided in the other side gear at a location corresponding to the spacer, and
      a supporting member mounted in the mount groove and configured to provide a reaction force on the cover through the spacer in a direction toward the drive shaft and to support the spacer, and
   wherein the cover is coupled to the housing.

2. The differential gear device of claim 1, wherein the spacer has one surface abutting the cover and another surface abutting the supporting member based on an axial direction of the drive shaft.

3. The differential gear device of claim 1, wherein the spacer is formed of a plastic, copper, or polyether ether ketone material.

4. The differential gear device of claim 1, wherein the supporting member is a ring spring or a snap ring.

5. A differential gear device for a vehicle, the differential gear device comprising:
   a housing;
   a pinion shaft provided inside the housing;
   pinion gears, one each respectively mounted on both ends of the pinion shaft; and
   a pair of side gears respectively disposed on both sides of a width direction of the vehicle and respectively engaged to the pinion gears,
   wherein a disconnector actuator system is coupled to one side gear and a drive shaft is coupled to the other side gear among the pair of side gears,
   wherein the differential gear device for the vehicle includes a noise reduction device provided between a cover and the other side gear coupled to the drive shaft to prevent a noise from being generated between one pinion gear of the pinion gears and the other side gear during operation of the disconnector actuator system,
   wherein the noise reduction device prevents backlash between the one pinion gear and the other side gear from becoming smaller,
   wherein the noise reduction device comprises a catching groove formed on an interior circumference of the cover at one end of the cover facing the drive shaft, a mount groove formed on an exterior circumference of a gear shaft provided in the other side gear at a location corresponding to the catching groove, and an elastic member mounted in the mount groove to provide an elastic force to the side gear against the cover in a direction toward the drive shaft, and wherein the cover is coupled to the housing.

6. The differential gear device of claim 5, wherein the elastic member is a ring spring.

7. The differential gear device of claim 5, wherein the catching groove is machined to a diameter of which an interior diameter is greater than an exterior diameter of the gear shaft.

8. The differential gear device of claim 5, wherein at least one oil groove communicating with an inside of the cover is formed in the catching groove.

9. The differential gear device of claim 8, wherein the at least one oil groove supplies oil from the housing to the elastic member.

\* \* \* \* \*